Patented May 19, 1953

2,639,268

UNITED STATES PATENT OFFICE 2,639,268

PROCESS FOR TREATING DRY, HYDROPHILIC PROTECTIVE COLLOIDS

Herbert L. Heiss, Racine, Wis., assignor to S. C. Johnson & Son, Inc., Racine, Wis.

No Drawing. Application October 12, 1948, Serial No. 54,214

12 Claims. (Cl. 252—313)

This invention relates to a process for treating dry, hydrophilic protective colloids. More specifically, it relates to a novel process for preparing dry, hydrophilic protective colloids for incorporation in aqueous mediums in which a water-insoluble material is suspended.

It is of common commercial knowledge that many compositions such as adhesives, cosmetics, cleaners, paints, ceramic compositions, etc. include a water-insoluble material suspended in an aqueous medium. However, it is necessary to provide a means with which to maintain the insoluble material in suspension in the aqueous medium. For this purpose a dry, hydrophilic protective colloid is usually provided.

However, much difficulty has been experienced in preparing dry, hydrophilic protective colloids for subsequent use as a protective colloid. For example, if a gum is to be used as the protective colloid, it is necessary that the gum be treated in such a manner as to cause the gum to disperse, swell and become gelatinous. It has been generally accepted that in order to so prepare a gum, that the gum be soaked in water for a period of from 3 to 72 hours and after or simultaneously with such soaking that thorough agitation be rendered. In some instances, even these time-taking precautions have proved insufficient since the gum particles have a tendency to adhere to one another, agglomerate and prohibit the water from completely gelatinizing the particles. Then too, many of the gum particles are of a size larger than desirable, so that the water may adequately treat the outer surface of the particles, but never totally gelatinize the inner core or center.

Now, in accordance with my invention, I have developed a novel process for the preparation of a dry, hydrophilic protective colloid for incorporation in an aqueous medium containing a water-insoluble material suspended therein. This novel process comprises mixing the hydrophilic colloid with the water-insoluble material in a dry state, then agitating and adding water to the mixture until the protective colloid is put in a colloidal state.

Now, having indicated in a general way the nature and purpose of this invention, the following examples will illustrate the invention. It is to be understood, however, that such examples are presented merely as illustrations of the invention and are not to be construed as limiting the same. In the examples the ingredients are given in parts by weight unless otherwise indicated.

Example 1

Three and fifteen hundredths parts of powdered gum tragacanth, 110.2 parts of diatomaceous earth and 31.50 parts of tripoli were mixed together in a dry state. While slow-speed mechanical agitation was rendered, 200 parts of water was added. The resulting mixture received slow-speed agitation for a period of approximately 5 minutes. In another vessel, 15.75 parts of glycerin, 31.50 parts of kerosene, 15.75 parts of paraffin oil and 31.50 parts of mineral seal oil were mixed together. This mixture was then added to the smooth paste contained in the first vessel. With agitation, 425.14 parts of additional water was added. The resulting composition, a cleaner for relatively smooth metallic surfaces, was placed in a container and allowed a quiescent period of three months. Thereafter, the composition was examined and tripoli and diatomaceous earth were found to be held in uniform suspension by means of the gum tragacanth which remained dispersed in a uniform colloidal state.

Example 2

Two hundred parts of water was slowly added to 3.15 parts of dry powdered gum tragacanth while slow-speed agitation was simultaneously rendered. The mixture was then agitated for approximately one and one-half hours. In another vessel 110.2 parts of diatomaceous earth, 31.50 parts of tripoli, 15.75 parts of glycerine, 31.50 parts of kerosene, 15.75 parts of paraffin oil and 31.50 parts of mineral seal oil were mixed together. This was admixed with the contents of the first vessel. Four hundred twenty five and fourteen hundredths parts of additional water was added with agitation. The resulting composition, a cleaner for relatively smooth metallic surfaces, was placed in a container and allowed a shelf or quiescent period of 3 months. It was noticed that a separation occurred and a layer of water formed at the top of the container. Upon examination, it was found that minute particles of gum tragacanth were visible to the naked eye and not uniformly dispersed in a colloidal state.

Example 3

Example 2 was repeated and the ingredients and proportions thereof remained the same as those used in Example 2. However, before the gum tragacanth was agitated in the 200 parts of water, it was allowed to soak in the water overnight.

After a quiescent period of three months, the composition was examined and was appreciated to have substantially the same stability and suspension characteristics as the composition of Example 1.

Example 4

Ten parts of dry sodium carboxymethylcellulose and 200 parts of dry diatomaceous earth were thoroughly mixed in a dry state in a suitable vessel. While slow-speed agitation was rendered, 300 parts of water was added. The resulting mixture then received slow-speed agitation for a period of approximately 5 minutes and a smooth heavy paste resulted in which the protective colloid was uniformly dispersed in a colloidal state. This paste was sufficiently prepared to be incorporated in a household cleaning composition.

*Example 5*

Thirty seven and five hundredths parts of dry powdered gum acacia and 597 parts of a mixture of fine tremolite and dolomite were mixed in a suitable vessel. Three hundred fifty parts of water was then added while the mixture was simultaneously agitated. After the water had been admixed, the composition was subjected to slow-speed agitation for approximately 7 minutes at which time a smooth heavy paste resulted in which the hydrophilic protective colloid was uniformly dispersed in a colloidal state. This paste was now ready to be incorporated in a water paint.

*Example 6*

Two hundred fifty parts of powdered karaya gum was mixed with 300 parts of zinc stearate in a dry state. Twelve thousand parts of water were gradually added to the gum-oxide-stearate mixture while agitation was simultaneously conducted. After the water had been added, slow-speed agitation was continued for a period of approximately 15 minutes. The resulting heavy, creamy dispersion was one in which the protective colloid was uniformly dispersed in a colloidal state and was now sufficiently prepared to be incorporated in a cosmetic beauty pack.

*Example 7*

Nine parts of powdered gum tragacanth and 301 parts of precipitated calcium carbonate were mixed in a dry state. Four hundred fifty parts of water was added while agitation was simultaneously conducted. After adding the water, slow-speed agitation was continued for a period of approximately 4 minutes. A smooth, heavy paste resulted in which the colloid was uniformly dispersed and which was now ready to be incorporated in a dentrifice.

In the above examples there has thus been illustrated my improved process for treating hydrophilic protective colloids. While the examples have illustrated the use of the process in the production of cleaning compositions, pains, cosmetics and dentrifices, it should be understood that the process is expedient in the production of any composition employing a hydrophilic protective colloid to suspend a water-insoluble material in an aqueous medium.

It is ordinarily necessary to disperse, swell and finally gelatinize the protective colloid in order to utilize its suspending powers. I have found that in compositions, which have as components a hydrophilic protective colloid and also some water-insoluble material, dry mixing and subsequently agitating the colloid in water with the insoluble material renders a new and desirable result. The insoluble material prohibits the minute hydrophilic colloidal particles from agglomerating and as the water gelatinizes the outer surface of the particles, the insoluble material shears off this outer gelatinized layer, allowing the water access to the inner layers of the particles. The agitation step, described in the examples, affords the insoluble material intimate contact with the hydrophilic colloid so that this shearing action may be properly rendered.

As shown in Example 2, agitation of the hydrophilic colloid in water for one and one-half hours was insufficient to disperse, swell and gelatinize the colloid as accomplished in Example 1 after an agitation period of approximately 5 minutes. It will be noted, however, that in Example 1 the insoluble material was mixed and then agitated in water with the colloid. The time-saving ability of this novel process will be appreciated from Example 3. The example illustrates the necessity of lengthy pre-soaking of the colloid to accomplish substantially the same results attained in Example 1.

Any dry, hydrophilic protective colloid may be satisfactorily treated by my method. Gums derived from trees and shrubs such as acacia, ghatti, karaya, Indian gums, tragacanth and Persian gums are operable. The gum products of seaweed, Irish moss, agar and the alginates are also expedient as well as the gums of seed pods and legumes, such as locust bean gum, locust kernel gum and guar gum. The hydrophilic gum derivative of lichens, Iceland moss, is also operable, as well as hemicellulose and water extracts of psyllium, quince and flaxseed. Synthetic gums may also be employed as the hydrophilic protective colloids. Examples of these are methylcellulose and sodium carboxymethylcellulose prepared from wood and cotton cellulose, British gum and dextrins derived from roots and seeds in starch manufacturing, and polyvinyl alcohol. Proteins animal glue and gelatin, are also expedient. Bentonite (sodium montmorillonite) is an example of an operable swelling clay, while refined magnesium aluminum silicate is illustrative of the hydrophilic type of silicate which may be incorporated as a protective colloid. As shown in the examples, in order to obtain the most satisfactory results, the hydrophilic colloid should be in a powdered state so as to afford the aqueous medium the best possible access.

Various water-insoluble materials have been shown in the examples and it should be understood that a wide range of such materials is operable, depending, of course, upon the specific composition in which such water-insoluble materials are to be used. Examples of such water-insoluble materials are: the water-insoluble carbonates such as calcium carbonate and barium carbonate; the insoluble metal oxides, such as zinc, iron, lead and aluminum oxide; earths such as diatomaceous and fuller's earth and the many and various mineral fillers and silicas such as tripoli and tremolite. The water-insoluble sulphates such as calcium and barium sulphate are likewise satisfactory operables.

A combination of hydrophilic protective colloids or insoluble materials or both may be employed where desired.

It will be noted in the examples, that varying time periods were allowed, for agitation. This period is dependent upon the insoluble material-colloid ratio; the greater the quantity of protective colloid employed in ratio to the insoluble material, the longer the period of agitation necessary to satisfactorily treat the hydrophilic colloid. However, the agitation period should not require more than one hour. In conducting this agitation, I have shown preference to a slow-speed paddle type of agitator. The paddle structure is not critical but a slow rate of speed is preferred since high-speed agitation tends to create an empty air-pocket around the agitator workpiece.

As demonstrated by the examples, this novel process may be employed in the manufacture of a great variety of compositions. In fact, the process may be used to great advantage in the manufacture of any composition which incorporates a hydrophilic protective colloid to suspend any water-insoluble material in an aqueous medium.

By the practising of my invention, the time necessary to prepare a hydrophilic protective colloid for use as a protective colloid has been reduced to a time period heretofore not realized attainable. Moreover, by employing my process, a composition is ultimately produced which possesses a uniformity of dispersion which in many cases excells that achieved in compositions employing hydrophilic protective colloids which have been prepared by tedious, time-taking methods.

I claim:

1. In a process of preparing a dry, hydrophilic protective colloid for incorporation in a composition wherein a water-insoluble powder is maintained in stable suspension in an aqueous medium by means of said colloid, the improved steps of mixing said colloid with said water-insoluble powder in a dry state, then agitating said mixture and gradually adding water thereto until said protective colloid is put in a colloidal state, said water-insoluble material remaining invariable.

2. In a process of preparing a dry, hydrophilic gum for incorporation in a composition wherein a water-insoluble powder is maintained in stable suspension in an aqueous medium by means of said gum, the improved steps of mixing said gum with said water-insoluble powder in a dry state, then agitating said mixture and gradually adding water thereto until said gum is put in a collodial state, said water-insoluble material remaining invariable.

3. In a process of preparing a dry, hydrophilic synthetic gum for incorporation in a composition wherein a water-insoluble powder is maintained in stable suspension in an aqueous medium by means of said gum, the improved steps of mixing said synthetic gum with said water-insoluble powder in a dry state, then agitating said mixture and gradually adding water thereto until said synthetic gum is put in a colloidal state, said water-insoluble material remaining invariable.

4. In a process of preparing sodium carboxymethylcellulose for incorporation in a composition wherein a water-insoluble powder is maintained in stable suspension in an aqueous medium by means of said sodium carboxymethylcellulose, the improved steps of mixing said sodium carboxymethylcellulose with said water-insoluble powder in a dry state, then agitating said mixture and gradually adding water thereto until said sodium carboxymethylcellulose is put in a colloidal state, said water-insoluble material remaining invariable.

5. In a process of preparing sodium carboxymethylcellulose for incorporation in a composition wherein diatomaceous earth is maintained in stable suspension in an aqueous medium by means of sodium carboxymethylcellulose, the improved steps of mixing said sodium carboxymethylcellulose with said diatomaceous earth in a dry state, then agitating said mixture and gradually adding water thereto until said sodium carboxymethylcellulose is put in a colloidal state, said diatomaceous earth remaining invariable.

6. In a process of preparing a dry, hydrophilic natural gum for incorporation in a composition wherein a water-insoluble material is maintained in stable suspension in an aqueous medium by means of said gum, the improved steps of mixing said natural gum with said water-insoluble material in a dry state, then agitating said mixture and gradually adding water thereto until said natural gum is put in a colloidal state, said water-insoluble material remaining invariable.

7. In a process of preparing gum tragacanth for incorporation in a composition wherein a water-insoluble material is maintained in stable suspension in an aqueous medium by means of gum tragacanth, the improved steps of mixing said gum tragacanth with said water-insoluble material in a dry state, then agitating said mixture and gradually adding water thereto until said gum tragacanth is put in a colloidal state, said water-insoluble material remaining invariable.

8. In a process of preparing gum tragacanth for incorporation in a composition wherein diatomaceous earth is maintained in stable suspension in an aqueous medium by means of gum tragacanth, the improved steps of mixing said gum tragacanth with said diatomaceous earth in a dry state, then agitating said mixture and gradually adding water thereto until said gum tragacanth is put in a colloidal state, said diatomaceous earth remaining invariable.

9. In a process of preparing a dry, hydrophilic gum for incorporation in a composition wherein a water-insoluble metal oxide is maintained in stable suspension in an aqueous medium by means of said gum, the improved steps of mixing said gum with said water-insoluble metal oxide in a dry state, then agitating said mixture and gradually adding water thereto until said gum is put in a colloidal state, said water-insoluble metal oxide remaining invariable.

10. In a process of preparing a dry, hydrophilic gum for incorporation in a composition wherein zinc oxide is maintained in stable suspension in an aqueous medum by means of said gum, the improved steps of mixing said gum with said zinc oxide in a dry state, then agitating said mixture and gradually adding water thereto until said gum is put in a colloidal state, said zinc oxide remaining invariable.

11. In a process of preparing sodium carboxymethylcellulose for incorporation in a composition wherein zinc oxide is maintained in stable suspension in an aqueous medium by means of said sodium carboxymethylcellulose, the improved steps of mixing said sodium carboxymethylcellulose with said zinc oxide in a dry state, then agitating said mixture and gradually adding water thereto until said sodium carboxymethylcellulose is put in a colloidal state, said zinc oxide remaining invariable.

12. In a process of preparing gum tragacanth for incorporation in a composition wherein zinc oxide is maintained in stable suspension in an aqueous medium by means of said gum tragacanth, the improved steps of mixing said gum tragacanth with said zinc oxide in a dry state, then agitating said mixture and gradually adding water thereto until said gum tragacanth is put in a colloidal state, said zinc oxide remaining invariable.

HERBERT L. HEISS.

(References on following page)

References Cited in the file of this patent

UNITED STATES PATENTS

| Number | Name | Date |
|---|---|---|
| 1,429,876 | Hemelmann | Sept. 19, 1922 |
| 1,682,293 | Lilienfeld | Aug. 28, 1928 |
| 1,866,923 | Chandler | July 12, 1932 |
| 1,887,978 | Joseph | Nov. 15, 1932 |
| 2,143,088 | Rockwell | Jan. 10, 1939 |
| 2,164,585 | Hentrich | July 4, 1939 |
| 2,180,152 | Kohler | Nov. 14, 1939 |
| 2,362,761 | Medl | Nov. 14, 1944 |
| 2,362,964 | Affleck | Nov. 21, 1944 |
| 2,425,768 | Wagner | Aug. 19, 1947 |
| 2,445,226 | Landers | July 13, 1948 |
| 2,566,754 | Van Dusen et al. | Sept. 4, 1951 |
| 2,570,827 | Madison et al. | Oct. 9, 1951 |